S. B. ZIMMER.
WINDOW.
APPLICATION FILED JUNE 1, 1918.

1,285,547.

Patented Nov. 19, 1918.
3 SHEETS—SHEET 1.

WITNESSES

INVENTOR
SAMUEL B. ZIMMER,
BY
ATTORNEYS

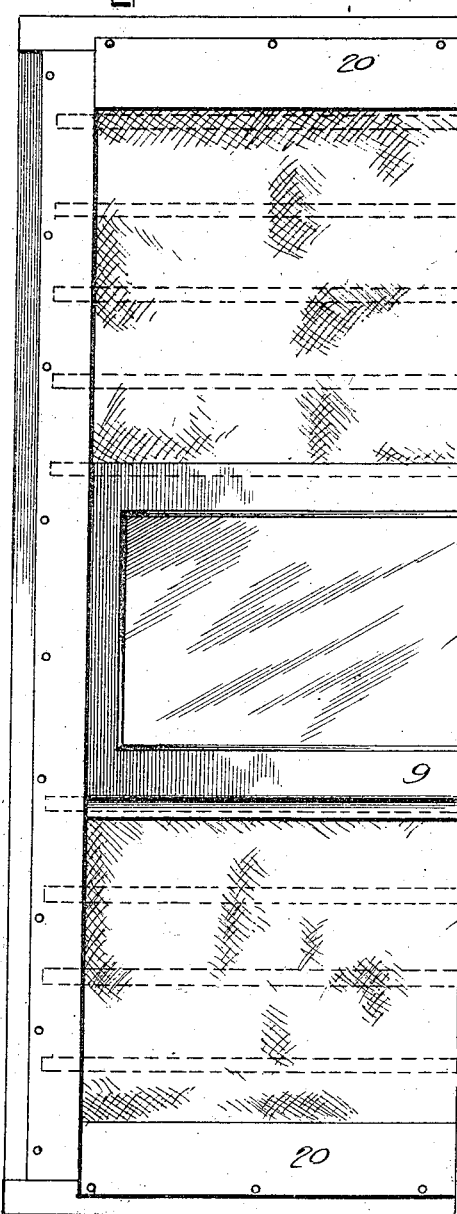

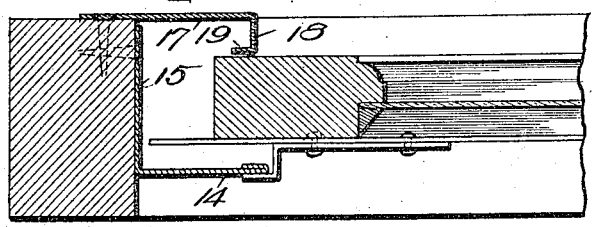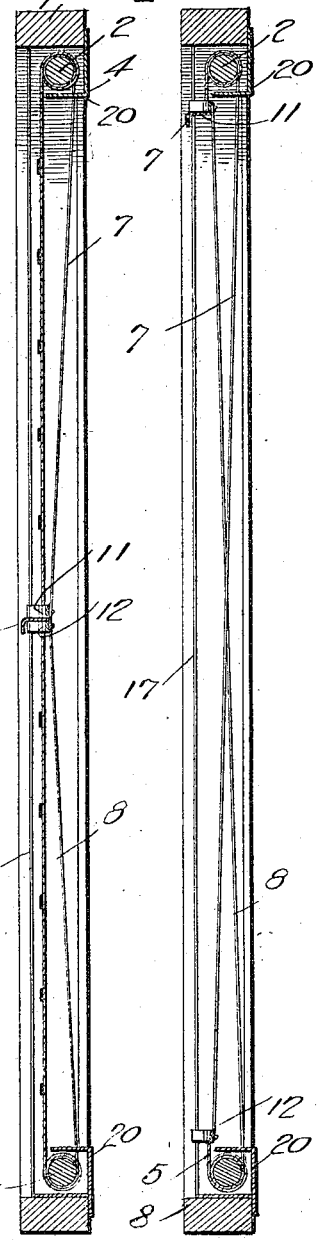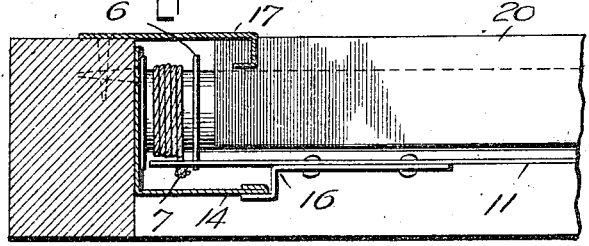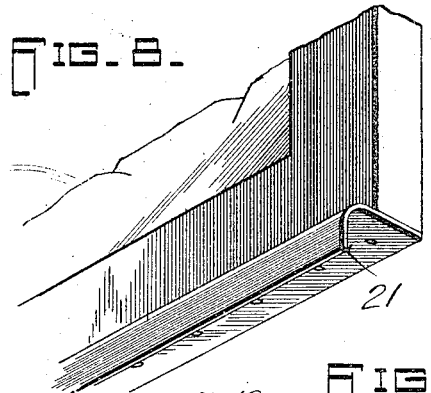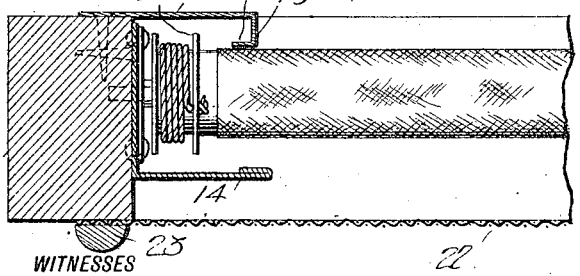

UNITED STATES PATENT OFFICE.

SAMUEL B. ZIMMER, OF EL CENTRO, CALIFORNIA.

WINDOW.

1,285,547.

Specification of Letters Patent. Patented Nov. 19, 1918.

Application filed June 1, 1918. Serial No. 237,697.

*To all whom it may concern:*

Be it known that I, SAMUEL B. ZIMMER, a citizen of the United States, and a resident of El Centro, in the county of Imperial and State of California, have invented new and useful Improvements in Windows, of which the following is a specification.

My invention is an improvement in windows, and has for its object to provide mechanism in connection with the windows of railroad cars for permitting the window opening to be completely or partially closed, and to bring the partial closure at any part of the casing.

In the drawings:

Fig. 3 is a front view of another embodiment of the invention;

Fig. 4 is a section on the line 4—4 of Fig. 3, looking in the direction of the arrows adjacent the line;

Fig. 5 is a perspective view of the shade;

Figure 1:
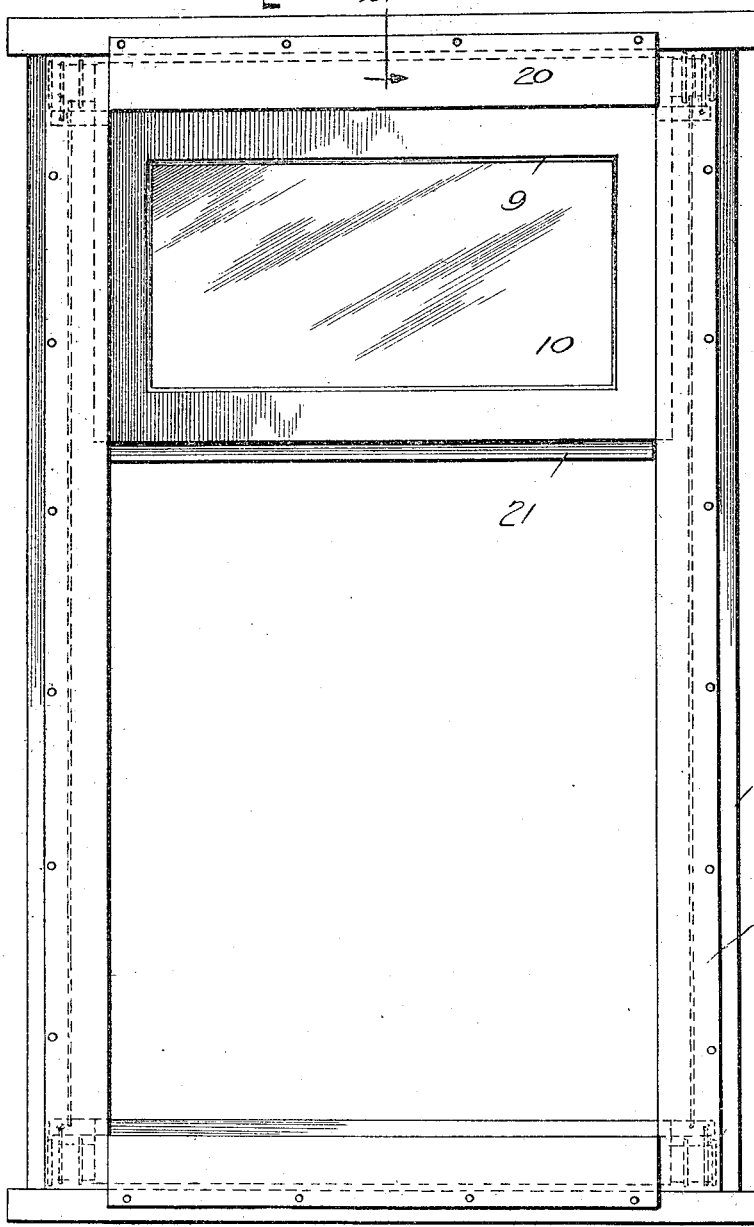
Figure 1 is a front view of a window constructed in accordance with the invention.
Figure 2:
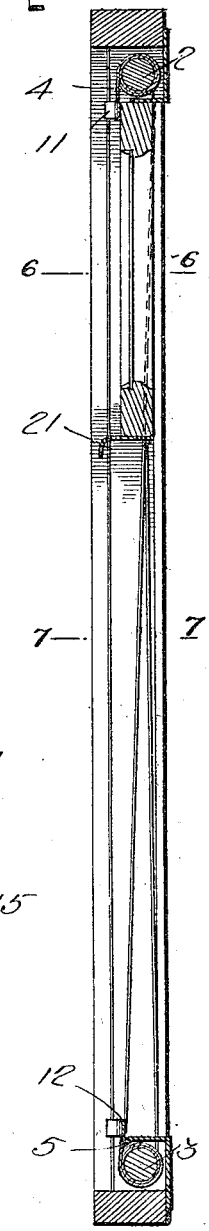
Fig. 2 is a section on the line 2—2 of Fig. 1, looking in the direction of the arrows adjacent the line.

Figs. 6 and 7 are sections on the lines 6—6 and 7—7, respectively, of Fig. 2;

Fig. 8 is a perspective view of the lower corner of one of the sashes;

Fig. 9 is a vertical section through a modified arrangement, showing the parts in one position;

Fig. 10 is a similar view, showing the parts in another position;

Fig. 11 is a horizontal section at one of the winding rollers.

In the embodiment of the invention shown in Figs. 1 to 5, the casement 1 of the window is provided at its top and bottom with rollers 2 and 3, respectively, which are journaled transversely of the casing, and each of these rollers has secured thereto a shade or curtain 4 and 5, respectively, the said shades or curtains winding upon the rollers at the connected end, as shown in Fig. 4. Each of these rollers is provided near its ends with annular ribs 6, and the shades or curtains 4 and 5 are between the ribs.

Cords 7 and 8 are secured to the ends of each of the rollers, the cords 7 being secured to the ends of the roller 2, while the cords 8 are secured to the ends of the roller 3. Each of these cords winds upon the roller at the outside of the adjacent rib 6 at the attached end, and the other end is connected in a manner to be presently described.

At each end of each curtain remote from the rollers 2 and 3 a cross bar 11 and 12, respectively, is provided, the said cross bars being secured to the curtains. Other cross bars or slats 13 are arranged at regular intervals transversely of each curtain, and it will be noticed that the ends of the cross bars 11, 12 and 13 extend beyond the side edges of the curtains, as shown more particularly in Figs. 3 and 5, for a purpose to be presently set forth. A sash, consisting of an open frame 9 carrying a sheet 10 of transparent material, as, for instance, glass, is arranged between the cross bars 11 and 12 of the two curtains. The cross bar 11 is secured to the top of the sash, while the cords 8 are connected to the bottom of the sash at the ends remote from the rollers 2 and 3, respectively. The ends of the cords 7 connected with the roller 2 for the lower curtain, and it will be obvious that when the sash is moved vertically in either direction the curtains will move therewith, so that the only opening between the curtains is at the sash. The extended ends of the cross bars 11, 12 and 13 move behind the portion 14 of an angle plate, which consists of the portion 14 and a portion 15 secured to the inner face of the side member of the casing.

Cross bars 11 and 12 are provided with an extension member 16 in the form of a double angle plate, consisting of two portions offset laterally with respect to each other, one of the said portions being secured to the cross bar, while the other engages outside of the portion 14 of the angle plate. This angle plate 14—15 extends the full length of the casement at each side thereof, and the portion 14 of each angle plate is of sufficient width to hide the cords 7 and 8 and the ribs 6.

These coils and the rib are hidden from the opposite side of the casement by means of a plate 17 which is secured to the casement, as shown, at one edge of the plate, and the opposite edge of the plate is bent at right angles toward the sash, as indicated at 18, and then backwardly upon itself, as indicated at 19, to form a guard and a shield at the opposite face of the casement from the plate 14—15. A guard and shield is also provided at the top and bottom of the casement, each of said guards or shields comprising angle plates 20 which are secured to the top and bottom of the casement, each consisting of a portion extending in the plane of the casement and a portion perpendicular thereto extending over the adjacent roller. These plates 20 are of such length that they do not interfere with the cords 7 and 8, extending a little short of the ribs 6.

If desired, the sash 9—10 may be dispensed with, as shown in Figs. 9 and 10, wherein the cross bars 11 and 12 abut each other to entirely close the opening of the casement, or to be separated from each other to leave an opening unprotected by any sash. Preferably, a weather strip, indicated at 21, is secured to the bottom of the casement, or to the bottom of the cross member 11, and this weather strip, as shown more particularly in Fig. 8, has a depending portion which is adapted to overlie the cross bar 12 to prevent the entrance of rain or the like. As shown in Fig. 11, a screen 22 may be arranged at the outside of the window casement, the said screen being secured to the casement and held in place by means of half round molding strips 23.

In operation, when the parts are arranged as shown in Figs. 3 and 4, it will be obvious that when the sash is moved up or down the curtain 4 above the sash and the curtain 5 below the sash will be moved in synchronism therewith, the curtain moving up when the sash is moved up and down when the sash is moved down. The same is true in Figs. 9 and 10, wherein the cords 7 winding on the roller 2 are connected with the cross bar 11 of the curtain 5, while the cords 8 winding on the roller 3 are connected with the cross bar 11 of the curtain 4. When the curtain 4 is moved upwardly, for instance, the cord 8 is unwound from the roller 3, rotating the roller and causing the said roller to wind up the curtain 5. Thus the movement of either curtain away from the other will constrain the said other curtain to move away from the first named curtain and the movement of either curtain toward the other will constrain the said other curtain to move toward the first named curtain. With this arrangement the window casement may be entirely closed, or the opening of the casement may be at any desired point in the length of the casement, either at the top, bottom or side. When the sash is used, the sash may be arranged wherever desired. With the ordinary curtain used in car windows, the opening must be at the bottom, if a small opening is desired. With the present construction a narrow opening may be arranged at any point desired in the casement as, for instance, opposite the eyes of the occupant, so that such occupant may view the scenery or obtain fresh air without the necessity of exposing the entire body.

I claim:

1. In a window casement, rollers journaled at the top and bottom of the casement, a curtain secured to each roller at one end and winding on said roller, cords winding upon the ends of the rollers, each curtain having a cross bar at its free end, and the outer ends of the cords of each roller being secured to the cross bar of the other curtain to constrain the curtains to move in opposite directions, the casement having guides at each side thereof and the cross bars having means for engaging the guides to guide the curtains, and a sash connecting the cross bar of one curtain and the cords.

2. In a window casement, rollers journaled at the top and bottom of the casement, a curtain secured to each roller at one end and winding on said roller, cords winding upon the ends of the rollers, each curtain having a cross bar at its free end, and the outer ends of the cords of each roller being secured to the cross bar of the other curtain to constrain the curtains to move in opposite directions, the casement having guides at each side thereof and the cross bars having means for engaging the guides to guide the curtains.

3. In a window casement, rollers journaled at the top and bottom of the casement, a curtain secured to each roller at one end and winding on said roller, cords winding upon the ends of the rollers, each curtain having a cross bar at its free end, and the outer ends of the cords of each roller being secured to the cross bar of the other curtain to constrain the curtains to move in opposite directions.

4. In a window casement, rollers journaled at the top and bottom of the casement, a curtain secured to each roller at one end and winding on said roller, cords winding upon the ends of the rollers, the cords of each roller being connected at their outer ends to the free end of the opposite curtain.

SAMUEL B. ZIMMER.

Witnesses:
J. L. TRAVERS,
J. P. NUFFER.